US006617707B1

United States Patent
Reece

(10) Patent No.: US 6,617,707 B1
(45) Date of Patent: Sep. 9, 2003

(54) DRIVER IDENTIFICATION SYSTEM

(76) Inventor: Scott A. Reece, 2294 Lake Galion Rd. E, Galion, OH (US) 44833

( * ) Notice: Subject to any disclaimer, the term of this patent is extended or adjusted under 35 U.S.C. 154(b) by 0 days.

(21) Appl. No.: 09/997,800

(22) Filed: Nov. 30, 2001

(51) Int. Cl.[7] .............................................. B60R 25/04
(52) U.S. Cl. ...................................................... 307/10.5
(58) Field of Search ................................. 307/9.1, 10.1, 307/10.2, 10.3, 10.5, 10.6; 283/73, 74, 75, 79, 117, 901

(56) References Cited

U.S. PATENT DOCUMENTS

| 3,803,551 | A | 4/1974 | Jordan |
| 4,438,752 | A | 3/1984 | Cheung |
| 4,777,377 | A | 10/1988 | Jeter |
| 4,982,072 | A | 1/1991 | Takigami |
| 4,998,753 | A | 3/1991 | Wichael |
| D377,373 | S | 1/1997 | Rebish |
| 6,224,109 | B1 * | 5/2001 | Yang ............................ 283/77 |
| 6,386,447 | B1 * | 5/2002 | Proefke et al. ............. 235/380 |

* cited by examiner

Primary Examiner—Matthew V. Nguyen

(57) ABSTRACT

A driver identification system for verifying that a driver of the vehicle has insurance. The driver identification system includes a scanner assembly being designed for operationally coupling to the ignition system of the vehicle whereby the scanner assembly selectively disables the ignition system of the vehicle. The scanner assembly has a housing. The housing is designed for coupling to a dashboard of the vehicle. A card member has an identification strip. The identification strip is positioned on a face of the card member. The card member is selectively insertable into the housing of the scanner assembly whereby the identification strip of the card member is read by a scanning unit of the scanner assembly. The identification strip identifies the driver of the vehicle when the identification strip is read by the scanning unit of the scanner assembly whereby the scanner assembly enables the ignition system of the vehicle.

7 Claims, 1 Drawing Sheet

DRIVER IDENTIFICATION SYSTEM

BACKGROUND OF THE INVENTION

1. Field of the Invention

The present invention relates to driver license checking systems and more particularly pertains to a new driver identification system for verifying that a driver of the vehicle has insurance.

2. Description of the Prior Art

The use of driver license checking systems is known in the prior art. U.S. Pat. No. 4,982,072 describes a system for providing information on a driver license of the user and using that information to determine the qualification of the user to drive the vehicle. Another type of driver license checking system is U.S. Pat. No. 4,777,377 having a system that uses a key switch or a magnetically coded card for activating a latching solenoid valve to either enable or disable the vehicle. Another type of driver license checking system is U.S. Pat. No. 4,998,753 having a driver's license having a readable magnetic tape having pertinent information relating to the driver. Another type of driver license checking system is U.S. Pat. No. 3,803,551 having a card reader for receiving a coded identification card for relaying information that is compared a pre-loaded code for starting the vehicle. Another type of driver license checking system is U.S. Pat. No. 4,438,752 having a ignition system for interrupting the power to the spark plugs when the security device is breached.

While these devices fulfill their respective, particular objectives and requirements, the need remains for a system that has certain improved features allowing for a convenient way to change codes with out the need to completely reprogram the system and confirming that a driver is insured.

SUMMARY OF THE INVENTION

The present invention meets the needs presented above by reading information from an identification strip of a card member received from the insurance agency and comparing that information to a code entered by the driver.

Still yet another object of the present invention is to provide a new driver identification system that eases enforcement of insurance requirements by only allowing insured drivers to operate the vehicle.

Even still another object of the present invention is to provide a new driver identification system that deters theft of the vehicle in that thief has to end correct code to be able to start the vehicle.

To this end, the present invention generally comprises a scanner assembly being designed for operationally coupling to the ignition system of the vehicle whereby the scanner assembly selectively disables the ignition system of the vehicle. The scanner assembly has a housing. The housing is designed for coupling to a dashboard of the vehicle whereby the scanner assembly is accessible by the driver. A card member has an identification strip. The identification strip is positioned on a face of the card member. The card member is selectively insertable into the housing of the scanner assembly whereby the identification strip of the card member is read by a scanning unit of the scanner assembly. The identification strip is designed for identifying the driver of the vehicle when the identification strip is read by the scanning unit of the scanner assembly whereby the scanner assembly enables the ignition system of the vehicle for permitting the vehicle to be started.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
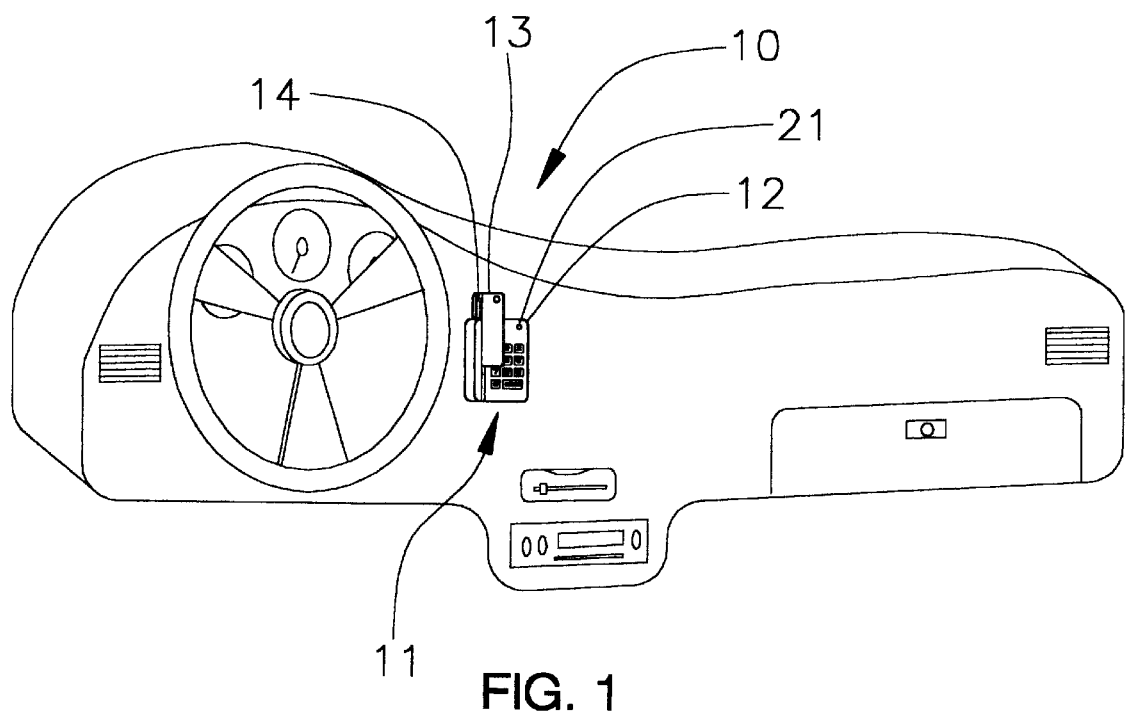
FIG. 1 is a perspective view of a new driver identification system according to the present invention positioned on a dashboard.
Figure 2:
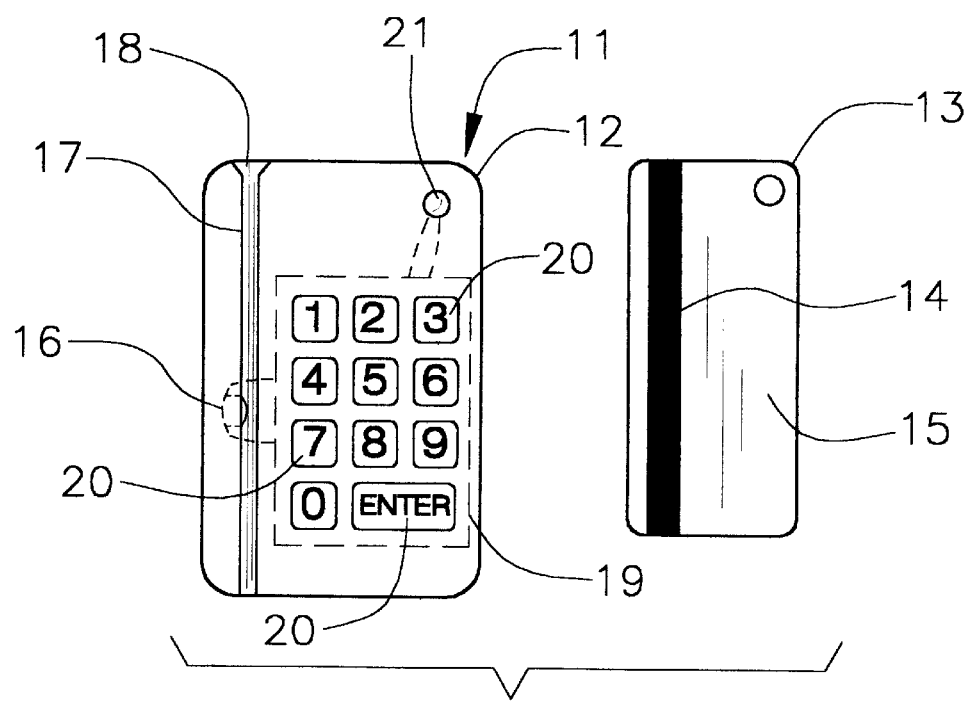
FIG. 2 is a front view of the present invention.

With reference now to the drawings, and in particular to FIGS. 1 and 2 thereof, a new driver identification system embodying the principles and concepts of the present invention and generally designated by the reference numeral 10 will be described.

As best illustrated in FIGS. 1 and 2, the driver identification system 10 generally comprises a scanner assembly 11 being designed for operationally coupling to the ignition system of the vehicle whereby the scanner assembly 11 selectively disables the ignition system of the vehicle. The scanner assembly 11 has a housing 12. The housing 12 is designed for coupling to a dashboard of the vehicle whereby the scanner assembly 11 is accessible by the driver.

A card member 13 has an identification strip 14. The identification strip 14 is positioned on a face 15 of the card member 13. The card member 13 is selectively insertable into the housing 12 of the scanner assembly 11 whereby the identification strip 14 of the card member 13 is read by a scanning unit 16 of the scanner assembly 11. The identification strip 14 is designed for identifying the driver of the vehicle when the identification strip 14 is read by the scanning unit 16 of the scanner assembly 11 whereby the scanner assembly 11 enables the ignition system of the vehicle for permitting the vehicle to be started.

The housing 12 of the scanner assembly 11 has a channel 17. The channel 17 extends along a length of the housing 12. The channel 17 is for receiving the card member 13 when the card member 13 is inserted into the housing 12 of the scanner assembly 11. The scanning unit 16 of the scanner assembly 11 is positioned adjacent the channel 17 for reading the identification strip 14 of the card member 13. The channel 17 of the housing 12 of the scanner assembly 11 has a flared end 18. The flared end 18 of the channel 17 is for facilitating alignment of the card member 13 with the channel 17 of the housing 12.

The scanner assembly 11 has a processing assembly 19. The processing assembly 19 is operationally coupled to the scanning unit 16. The processing assembly 19 receives information from the scanning unit 16 when the identification strip 14 of the card member 13 is passed by the scanning unit 16. The processing assembly 19 is designed for operationally coupling to the ignition system of the vehicle whereby the processing assembly 19 enables the ignition system of the vehicle when the processing assembly 19 receives information for the scanning unit 16.

The processing assembly 19 of the scanner assembly 11 has a plurality of buttons 20. Each of the buttons 20 is operationally coupled to the processing assembly 19. Each of the buttons 20 is positioned on a front face 15 of the housing 12 whereby the buttons 20 are designed for being actuated by the driver. The buttons 20 are designed for permitting the driver to enter a code into the processing assembly 19 for comparison to information received from the scanning unit 16 to enable the ignition system of the vehicle when code entered matches the information read by the scanning unit 16.

The scanner assembly 11 has a light member 21. The light member 21 is operationally coupled to the processing assembly 19. The light member 21 is coupled to the housing 12. The light member 21 is designed for emitting light for indicating confirmation of information received from the scanner unit matching the code entered by the driver.

In use, the user enters the vehicle and inserts their card member 13 into the channel 17 of the housing 12. The identification strip 14 on the card member 13 is swiped by the scanning unit 16 and the scanning unit 16 reads the information from the identification strip 14. The user then enters a code into the processing assembly 19 through the buttons 20. The processing assembly 19 compares the code entered into the processing assembly 19 and the information read from the identification strip 14 from the card member 13. The processor assembly enables the ignition system of the vehicle when the code entered by the user matches the information read from the identification strip 14 of the card member 13. The card member 13 could be issued by insurance companies to insure that the driver is insured before being able to operate the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A driver identification system for disrupting the ignition system of a vehicle until a driver provides proper identification, the driver identification system comprising:

a scanner assembly being adapted for operationally coupling to the ignition system of the vehicle such that said scanner assembly selectively disables the ignition system of the vehicle, said scanner assembly having a housing, said housing being adapted for coupling to a dashboard of the vehicle such that said scanner assembly is accessible by the driver; and a card member having an identification strip, said identification strip being positioned on a face of said card member said card member being selectively insertable into said housing of said scanner assembly such that said identification strip of said card member is read by a scanning unit of said scanner assembly, said identification strip being adapted for identifying the driver of the vehicle when said identification strip is read by said scanning unit of said scanner assembly such that said scanner assembly enables the ignition system of the vehicle for permitting the vehicle to be started.

2. The driver identification system as set forth in claim 1, further comprising:

said housing of said scanner assembly having a channel, said channel extending along a length of the housing, said channel being for receiving said card member when said card member is inserted into said housing of said scanner assembly, said scanning unit of said scanner assembly being positioned adjacent said channel for reading said identification strip of said card member.

3. The driver identification system as set forth in claim 2, further comprising:

said channel of said housing of said scanner assembly having a flared end, said flared end of said channel being for facilitating alignment of said card member with said channel of said housing.

4. The driver identification system as set forth in claim 1, further comprising:

said scanner assembly having a processing assembly, said processing assembly being operationally coupled to said scanning unit such that said processing assembly receives information from said scanning unit when said identification strip of said card member is passed by said scanning unit, said processing assembly being adapted for operationally coupling to the ignition system of the vehicle such that said processing assembly enables the ignition system of the vehicle when said processing assembly receives information for said scanning unit.

5. The driver identification system as set forth in claim 4, further comprising:

said processing assembly of said scanner assembly having a plurality of buttons, each of said buttons being operationally coupled to said processing assembly, each of said buttons being positioned on a front face of said housing such that said buttons are adapted for being actuated by the driver, said buttons being adapted for permitting the driver to enter a code into said processing assembly for comparison to information received from said scanning unit to enable the ignition system of the vehicle when code entered matches the information read by the scanning unit.

6. The driver identification system as set forth in claim 5, further comprising:

said scanner assembly having a light member, said light member being operationally coupled to said processing assembly, said light member being coupled to said housing, said light member being adapted for emitting light for indicating confirmation of information received from said scanner unit matching the code entered by the driver.

7. A driver identification system for disrupting the ignition system of a vehicle until a driver provides proper identification, the driver identification system comprising:

a scanner assembly being adapted for operationally coupling to the ignition system of the vehicle such that said scanner assembly selectively disables the ignition system of the vehicle, said scanner assembly having a housing, said housing being adapted for coupling to a dashboard of the vehicle such that said scanner assembly is accessible by the driver;

a card member having an identification strip, said identification strip being positioned on a face of said card member, said card member being selectively insertable into said housing of said scanner assembly such that said identification strip of said card member is read by a scanning unit of said scanner assembly, said identification strip being adapted for identifying the driver of the vehicle when said identification strip is read by said scanning unit of said scanner assembly such that said scanner assembly enables the ignition system of the vehicle for permitting the vehicle to be started;

said housing of said scanner assembly having a channel, said channel extending along a length of the housing, said channel being for receiving said card member when said card member is inserted into said housing of said scanner assembly, said scanning unit of said scanner assembly being positioned adjacent said channel for reading said identification strip of said card member;

said channel of said housing of said scanner assembly having a flared end, said flared end of said channel being for facilitating alignment of said card member with said channel of said housing;

said scanner assembly having a processing assembly, said processing assembly being operationally coupled to said scanning unit such that said processing assembly receives information from said scanning unit when said identification strip of said card member is passed by said scanning unit, said processing assembly being adapted for operationally coupling to the ignition system of the vehicle such that said processing assembly enables the ignition system of the vehicle when said processing assembly receives information for said scanning unit;

said processing assembly of said scanner assembly having a plurality of buttons, each of said buttons being operationally coupled to said processing assembly, each of said buttons being positioned on a front face of said housing such that said buttons are adapted for being actuated by the driver, said buttons being adapted for permitting the driver to enter a code into said processing assembly for comparison to information received from said scanning unit to enable the ignition system of the vehicle when code entered matches the information read by the scanning unit; and said scanner assembly having a light member, said light member being operationally coupled to said processing assembly, said light member being coupled to said housing, said light member being adapted for emitting light for indicating confirmation of information received from said scanner unit matching the code entered by the driver.

* * * * *